United States Patent [19]

Nolley, Jr.

[11] 4,206,722
[45] Jun. 10, 1980

[54] HEAT RECOVERY PROCESS FOR FIRED POWER PLANTS

[75] Inventor: John P. Nolley, Jr., Houston, Tex.
[73] Assignee: UOP Inc., Des Plaines, Ill.
[21] Appl. No.: 951,950
[22] Filed: Oct. 16, 1978
[51] Int. Cl.² ............................................. F28F 27/02
[52] U.S. Cl. ...................................... 122/1 A; 110/302; 110/345; 122/DIG. 1; 165/7; 165/8
[58] Field of Search ................ 122/1 R, 1 A, DIG. 1; 110/345, 302, 304; 165/7, 8, 9

[56] References Cited
U.S. PATENT DOCUMENTS

| | | | |
|---|---|---|---|
| 2,913,228 | 11/1959 | Fikenscher | 122/DIG. 1 |
| 3,148,665 | 9/1964 | Switzer | 122/1 R |
| 4,102,636 | 7/1978 | Phillips et al. | 165/7 X |
| 4,121,541 | 10/1978 | Kneissl et al. | 122/1 R |
| 4,129,176 | 12/1978 | Heyan et al. | 165/7 |

Primary Examiner—Edward G. Favors
Attorney, Agent, or Firm—James R. Hoatson, Jr.; John F. Spears, Jr.; William H. Page, II

[57] ABSTRACT

Heat is recovered from the flue gas stream discharged from a power plant combustion zone by heat exchange of the flue gas stream against the air stream which enters the combustion zone. Each gas stream flows through two rotating air preheaters, with a first preheater rotating at a constant rate and a second preheater rotating at a variable rate. The rate of rotation of the second preheater is varied to adjust the temperature of either the heated air stream or the temperature of the flue gas stream after passage through the preheaters.

6 Claims, 1 Drawing Figure

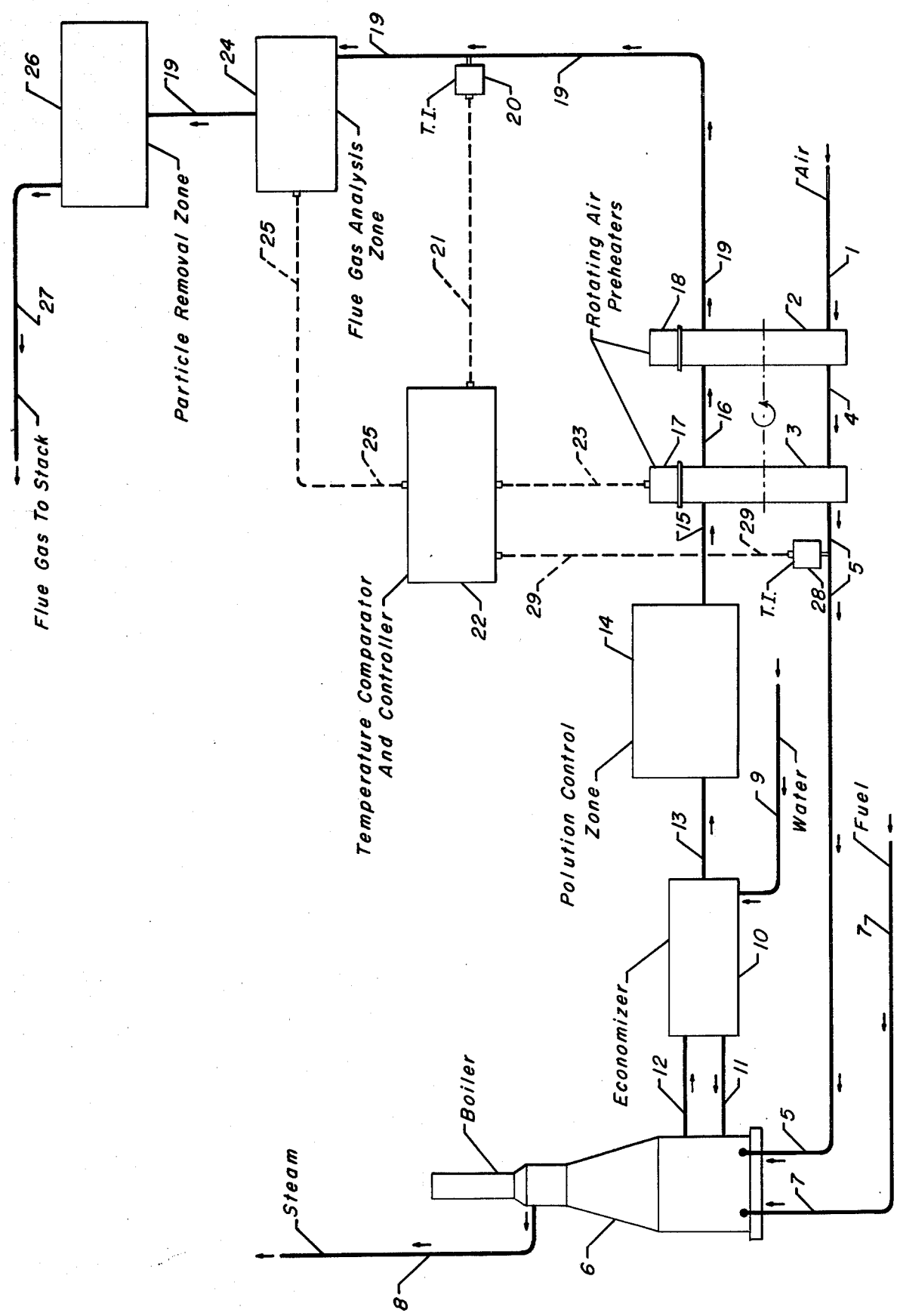

HEAT RECOVERY PROCESS FOR FIRED POWER PLANTS

FIELD OF THE INVENTION

The invention relates to the design and operation of steam boilers which are heated by the combustion of a carbonaceous fuel. The invention more specifically relates to the design and operation of rotating regenerative air heaters which are normally referred to as air preheaters when used on a fired boiler. The invention is directly concerned with a method of controlling the amount of heat exchange between the entering air stream and the flue gas stream of a fired boiler by varying the rate of rotation of an air preheater in response to the present temperature and acid dew point of the cooled flue gas stream. The invention is also directly concerned with controlling the inlet temperature of the air stream fed to the fired boiler by varying the amount of heat recovered from the exiting flue gas stream.

PRIOR ART

It is readily apparent to even a casual observer that the operation of steam-driven power plants, such as for the generation of electricity, have been in widespread use for a long period of time. The design and operation of the equipment used in steam power plants has therefore reached a high level of development and is described in standard references. For instance, a large portion of Chapter 9 of The Standard Handbook for Mechanical Engineers, 7th Ed., McGraw-Hill Book Co. (1967) is devoted to the subject of steam boilers and associated equipment.

It has long been recognized that a significant increase in the efficiency of a fired boiler, and therefore a reduction in operating cost, may be obtained by recovering sensible heat from the flue gas before it is discharged through the stack. A device commonly utilized to recover some of this heat by transferring it to the air used to sustain combustion is referred to as an air preheater. This apparatus is described at pages 9-35 and 9-36 of the previously referred to Handbook and in U.S. Pat. Nos. 4,040,474 and 4,040,475 (both Cl. 165-9). The hot flue gas stream is passed through one portion of the preheater and warms a number of high surface area heat storage elements. The entire cylindrical mass of heat storage elements is slowly rotated about the central axis of the preheater to bring the high temperature heat storage elements into contact with the relatively cold air stream being fed to the boiler in a second portion of the preheater. This effects a warming of the entering air stream and the recovery of some sensible heat from the flue gas stream.

When the boiler fuel contains sulfur, the flue gas stream will contain both water vapor and sulfur oxides. Recovering too much heat from the flue gas stream will cause the temperature of the flue gas stream to fall below its acid dew point. The resultant condensate is fairly corrosive and can cause severe damage to the air preheater and the flue gas duct system. The corrosion caused by excessive cooling is taken into account during the design of the air preheater as it places a limit on the maximum desired size of the preheater.

It is also an accepted practice to employ various means of maintaining the flue gas stream at a temperature above its acid dew point by preventing excessive cooling of the heat storage elements when they are exposed to the air stream. These may comprise the provision of steam-heated heating coils in the air inlet ducts upstream of the preheater, the recirculation of heated air to the air inlet of the preheater, or the bypassing of a portion of the cold air around the preheater.

It is believed that heretofore the air stream and the flue gas stream were passed through a single rotating air preheater. It is also believed that heretofore rotating air preheaters were operated at a constant rate of rotation when in use.

SUMMARY OF THE INVENTION

The invention provides a method of controlling the operation of rotating air preheaters used to recover heat from the flue gas stream of a fired boiler or similar fired power plant. One embodiment of the invention may be characterized as a method of controlling the rate of heat exchange between an air stream which is being supplied to a combustion zone and the flue gas stream produced in the combustion zone which comprises the steps of passing both the air stream and the flue gas stream through a first and a second rotating preheaters while the first preheater is being rotated at a substantially constant rate; determining the present acid dew point temperature of the flue gas stream downstream of the first and second preheaters based on a chemical analysis of the flue gas stream; calculating a preselected reference temperature by adding a safety factor to the present acid dew point temperature of the flue gas stream; monitoring the instantaneous temperature of the flue gas stream downstream of the first and second preheaters; comparing the instantaneous temperature to the preselected reference temperature to generate a temperature difference; and adjusting the rate of rotation of the second preheater in a manner which decreases this temperature difference.

In a simpler embodiment of the invention, the preselected reference temperature is not periodically adjusted and the composition of the flue gas stream is not continuously monitored.

A third embodiment of the invention is a process for producing steam which comprises the steps of passing an air stream through a first and a second rotating air preheaters and heating the air stream to a first temperature; passing the air stream into a combustion zone to support the combustion of a carbonaceous fuel and producing steam in a boiler and a relatively high temperature flue gas stream; passing the flue gas stream through a pollution control zone; cooling the flue gas stream to a second temperature by passage through the first and second rotating air preheaters; generating a temperature difference by comparing said first temperature with a set point representative of the desired temperature of the air stream; and adjusting the rate of rotation of either the first or the second preheater in a manner which decreases the temperature difference while the rate of rotation of the other preheater is maintained constant.

DESCRIPTION OF THE DRAWING

The Drawing presents a simplified flow diagram of a steam generating facility which utilizes the preferred embodiment of the invention. This representation of the invention is not intended to exclude from the scope of the invention those other embodiments which are the result of normal or expected modifications of that shown.

An air stream collected from the outside atmosphere enters the system in line 1 and is passed through the heat releasing zone of a first rotating air preheater 2 wherein it is warmed above the ambient atmospheric temperature. The air stream is then passed through line 4 to the heat releasing zone of a second rotating air preheater 3 and is further warmed. It is then carried via line 5 into the combustion zone of a boiler 6 wherein a carbonaceous fuel, such as pulverized coal, from line 7 is burned. Water, which may comprise recycled condensate, enters the system in line 9 and is heated by indirect heat exchange in an economizer 10 before entering the boiler through line 11. The water is therein vaporized to form steam removed via line 8.

The high temperature flue gas stream which is formed in the combustion zone of the boiler is removed in line 12. Some heat is recovered from the flue gas stream by indirect heat exchange against the boiler feed water in the economizer. The flue gas stream is then passed into a pollution control zone 14 through line 13 and therein processed for the removal of atmospheric pollutants such as sulfur oxides and nitrogen oxides. It is removed from the pollution control zone in line 15 and passed through the heat collecting section of the second rotating air preheater 3. When this second preheater is in operation, the flue gas is cooled by the transfer of heat to the entering air stream. The flue gas stream is then passed into the first air preheater 2 through line 16. This preheater is rotated at a constant rate of rotation by a motor 18 through a gear train along the circular outer edge of the preheater. The flue gas stream is therefore further cooled in the first preheater.

After this final cooling, the flue gas stream is passed through line 19 to an analysis zone 24 in which the composition of the flue gas stream is monitored to provide a determination of the present acid dew point of the flue gas stream. A signal representative of the acid dew point is carried to the temperature comparator and controller 22 by a first signal carrying means 25. The instantaneous temperature of the cooled flue gas stream is monitored by a temperature indicator 20, such as one or more thermocouples inserted into the flowing gas stream. The resultant temperature reading is transmitted to the temperature comparator and controller through a second signal carrying means 21.

The instantaneous temperature of the flue gas stream is compared with an established preselected reference temperature based on the present acid dew point of the flue gas stream to establish the difference between the instantaneous flue gas temperature and the preselected reference temperature. Based on this temperature difference, the comparator 22 generates a signal corresponding to the then desired adjustment in the rate of rotation of the second preheater. This adjustment will be one which, if feasible, reduces the difference between the instantaneous temperature of the flue gas stream and the preselected reference temperature. The signal generated by the comparator is transmitted to a variable speed electric motor 17 through a third signal carrying means 23. The flue gas stream is passed into a particle removal zone 26 and is then vented from the process through line 27.

In a second embodiment of the invention, the operation of the boiler 6 is stabilized by smoothing variations in the temperature of the high volume air stream fed to the combustion zone in line 5. This may be desired to prevent variations in the temperature of the flue gas stream, such as can be caused by the pollution control zone 14, from producing corresponding changes in the temperature of the air stream.

The temperature of the heated air stream is monitored by a temperature indicator 28. A signal representative of this temperature is transmitted to the temperature comparator and controller 22 by a fourth signal carrying means 29. The difference between the instantaneous temperature of the air stream and a set point is determined. A signal corresponding to the adjustment which decreases this difference is then transmitted to the variable speed motor 17 and the rate of rotation of the second preheater 3 is adjusted. The set point may be periodically changed by the temperature comparator and controller based on the determined present acid dew point temperature and the instantaneous temperature of the cooled flue gas stream.

DETAILED DESCRIPTION

To maximize the efficiency of large steam generation systems, such as those used to generate electricity in public utility systems, the hot flue gas stream produced in the combustion zone is normally heat exchanged against colder streams which are entering the system. The normal sequence is to first heat exchange the flue gas against the boiler feed water in an apparatus customarily referred to as an economizer and then heat exchange the flue gas against the entering air stream in an apparatus known as an air preheater. These steps recover heat from the flue gas stream and return it to the boiler and combustion zone respectively, thereby reducing the amount of heat which is lost in the flue gas when it is discharged. This in turn makes the steam generation process more efficient and less expensive.

The carbonaceous fuels, such as coal, fuel oils, shale oil, coke, natural gas, SNG or wood scraps, which are burned in the combustion zone will normally contain some sulfur. The combustion process converts this sulfur to sulfur dioxide and sulfur trioxide. When the flue gas stream is cooled to a low enough temperature, these sulfur oxides interact with the water vapor which is also present in the flue gas stream to form droplets of a weak sulfuric acid solution. This solution is very corrosive to the many metal surfaces present in the duct work and heat exchangers through which the flue gas stream passes, and it is therefore not desirable to cool the flue gas stream below what is commonly referred to as the acid dew point temperature of the gas.

Because of the corrosion problem, the acid dew point temperature of the gas will normally be the lowest temperature to which it is economically feasible to cool a flue gas stream by the recovery of heat in the air preheater. Furthermore, it is best to allow a safety margin which minimizes acid condensation on cold surfaces in heat exchangers and duct work and which prevents acid misting during occasional fluctuations in the operation of the system. The economic benefit or recovering heat from the flue gas stream is therefore highly constrained by the corrosion problems which it may cause.

The temperature of the flue gas stream produced in a large steam generation facility may be changed by many factors, such as the demand being placed on the boiler and changes in the temperature of the air fed to the combustion zone. The resulting variation in the temperature of the hot flue gas carries through the preheaters and produces fluctuations in the temperature of the flue gas downstream of the preheater. The instantaneous temperature of the cooled flue gas stream leaving the preheater may also be influenced by the operation of the upstream pollution control zone or the economizer. Furthermore, the sulfur content of the carbonaceous fuel and the effectiveness of the pollution control zone may also both change with time. Both the temperature and the acid dew point of the flue gas stream leaving the air preheater are therefore variable to some degree. In order to accommodate these variations and also avoid increased corrosion rates, it is necessary to design a single constant rate rotating air preheater in a manner which allows a sizable safety factor and which allows much heat to escape.

It is an objective of the present invention to provide a more efficient method of operating steam generation facilities. It is another objective to provide a process for recovering an increased amount of heat from the flue gas stream of fired boilers. Yet another objective of the invention is to provide an improved method of recovering heat from the flue gas stream formed by the combustion of a carbonaceous fuel by the use of rotating air preheaters. A further objective of the invention is to provide a process for producing steam wherein the operation of the combustion zone is stabilized.

The various types of apparatus used in the practice of the present invention are well developed and may be of standard design. The invention may actually be applied to already existing power plants to improve their efficiency or to increase their ease of operation. The inventive concept is especially suited for application on existing fired power plants which are being or have been retrofitted with a sulfur oxide pollution control zone upstream of a rotating air preheater to comply with increasingly stringent pollution standards. The removal of sulfur in these pollution control zones lowers the acid dew point of the flue gas stream and therefore allows more heat to be recovered in the air preheater. The existing preheater may not be capable of extracting this additional heat and the addition of a second, supplemental preheater may then be desirable. The subject invention may be applied to any large scale combustion process and is not limited to the generation of steam in electrical power plants.

Unless otherwise specified, commonly used terms such as "boiler" or "economizer" are intended to have their normal and customary meanings. The terms "air preheater" and "preheater" are used interchangeably herein to refer to heat exchangers which transfer heat from the flue gas stream to the air stream which is fed into the combustion zone. One device which is used for this purpose is referred to as a recuperator. In these devices, the air stream and the flue gas stream flow across the opposite sides of a metal wall through which the heat is transferred by indirect heat exchange. The subject invention is not directed to processes utilizing recuperators.

The air preheaters utilized in the subject invention are commonly referred to as rotating or regenerative heat exchangers. Examples of this type are the apparatus shown and described in the previously cited references including U.S. Pat. Nos. 4,040,474 and 4,040,475. Rotating air preheaters comprise a large cylindrical rotor of heat absorbing material which is encased within a stationary housing conforming generally to the shape of the rotor. The rotor is supported on a central vertical shaft and is typically rotated by an electric motor linked to the outer circumference of the rotor by speed reducing gears. Alternatively, the rotor may be mounted to rotate in a vertical plane and driven through a horizontal central shaft indirectly attached to the motor.

The rotor is often composed of a large number of metal, ceramic-coated metal, or ceramic heat absorbing elements separated by passages for the gas streams. Corrosion resistance is important since the corrosive condensate will form on the surface of the cold heat absorbing elements. The housing is divided into a heat collecting zone and a heat releasing zone by sector plates, baffles and mechanical or pneumatic seals. The hot flue gas stream passes through the heat collecting zone and the air stream passes through the heat releasing zone. The movement of the rotor continuously carries hot heat absorbing elements from the heat collecting zone into the heat releasing zone and into contact with the relatively cold air stream. Heat is thereby recovered from the flue gas and recycled to the combustion zone in the air stream.

The inventive concept involves passing both the flue gas stream and the air stream through two different rotating air preheaters in series. This is not the same as dividing these two streams into two or more portions and then passing these portions through parallel air preheaters as is done when the air streams are considered too large for one preheater. The preheater which the air stream enters first is referred to herein as the first preheater. The flue gas stream may also enter the first preheater first, but preferably the flue gas stream passes through the second preheater before entering the first preheater. That is, the flue gas stream and the air stream preferably flow countercurrent to each other in two preheaters in series.

One of the preheaters is rotated at a substantially constant rate of rotation. Preferably, this is the first preheater. By substantially constant rate of rotation is meant the rotational velocity which results from the steady state operation of the electric motor or other driving means acting on the rotor of the preheater with no intentional variation of either the power fed to the motor or driving means or in the speed reduction ratio, etc.

The other preheater is operated at a variable rate of rotation which may range from no rotation to the maximum practical speed within the capability of the motor which drives the rotor. The large size of the rotors will necessitate making only gradual changes in the rate of rotation of the preheater rotor. The preheater rotor having the variable rate of rotation is preferably smaller in mass than the constant rate preheater to facilitate changing its rotational velocity.

In the first major embodiment of the inventive concept, the instantaneous temperature of the flue gas stream is measured after it has passed through both preheaters and has been allowed to intermix and reach a uniform temperature. Preferably two or more temperature readings are taken at different locations. This instantaneous temperature of the flue gas stream is equivalent to its present temperature. It should be measured at a point downstream of any substantial cooling effect.

The acid dew point temperature of the flue gas stream must also be determined in this first embodiment of the invention. This determination must be made downstream of any pollution control zone or other system used in the process which will materially change the sulfur content or acid dew point of the flue gas stream. Any sulfur compounds added to the flue gas stream to condition it for passage into an electrostatic precipitator must be added upstream of the acid dew point measurement or accounted for.

The acid dew point may theoretically by calculated based on the flow rates and composition of the streams fed into the combustion zone and the operational characteristics of any pollution control system utilized in the process. However, it is preferred that the acid dew point of the flue gas stream is determined directly from an analysis of the flue gas stream which provides the relative concentration of one or more of the chemicals chosen from the group consisting of sulfur dioxide, sulfur trioxide, water vapor, carbon dioxide, carbon monoxide, nitrogen, sulfur and oxygen. This analysis is preferably performed by an on-line analytical device or devices which continuously monitor the composition of the flue gas.

To minimize the expense of installing and operating the embodiment of the invention, the determination of the acid dew point temperature may be performed using the same instrumentation which monitors the composition of the flue gas stream in order to determine compliance with pollution discharge regulations or to regulate operation of a pollution control zone. Samples used to determine the acid dew point temperature of the flue gas stream may be taken either upstream or downstream of the air preheater.

A safety margin of at least ten and preferably more than twenty Centigrade degrees is added to the present acid dew point to determine what is referred to herein as the preselected reference temperature. This is the temperature to which the flue gas stream is cooled to achieve the maximum heat recovery possible in the air preheaters which is consistent with avoiding excessive corrosion rates in the apparatus through which the cooled flue gas stream passes. The difference between the preselected reference temperature and the instantaneous temperature of the flue gas stream is then determined in a temperature comparator. This is preferably an analog or digital process control device which utilizes the preselected reference temperature as a set point. It should be damped by use of an integral control mode of operation since the mass of the preheater rotor makes rapid changes in rotor speed impractical.

The rate of rotation of the variable speed rotor is adjusted in a manner which reduces the difference between the preselected reference temperature and the actual or instantaneous temperature of the flue gas stream. If the instantaneous temperature of the flue gas stream is above the preselected reference temperature, then the rate of rotation of the variation speed rotor should be increased, if possible, to transfer more heat from the flue gas stream to the air stream. The rate of rotation of the preheater rotor should be decreased if the instantaneous temperature of the flue gas stream is below the preselected reference temperature as this indicates the flue gas stream is being cooled to a temperature approaching or below its dew point temperature.

The preferred embodiment of the invention may be characterized as a method of controlling the rate of heat exchange in a first and a second rotating air preheaters between an air stream which is subsequently passed into a combustion zone wherein a carbonaceous fuel is burned and a flue gas stream is formed and the flue gas stream, with the flue gas stream being treated for the removal of sulfur oxides by passage through a pollution control zone prior to being heated by series passage through the first and the second rotating air preheaters. The preferred control method comprises the steps of periodically determining the relative concentration of at least one component of the flue gas stream at a point downstream of the pollution control zone and determining the present acid dew point temperature of the flue gas stream downstream of the pollution control zone on the basis of the measured component concentrations; periodically calculating a preselected reference temperature by adding a safety factor of at least 20 centigrade degrees to the present acid dew point temperature; monitoring the instantaneous temperature of the flue gas stream at a point downstream of the first and the second rotating air preheaters while the first preheater is being rotated at a substantially constant rate; comparing the instantaneous temperature of the flue gas stream and the preselected reference temperature and thereby determining a temperature difference; and adjusting the rate of rotation of the second preheater in a manner which decreases this temperature difference.

The preselected reference temperature is used as the set point of the temperature comparator and is periodically updated by replacement with each newly determined value. The apparatus required to perform these steps may be assembled from readily available component parts utilized in widely practiced pollution abatement and process control systems. The operation of the equipment should be well within the expertise of skilled technicians and trained operators.

In the second major embodiment of the invention, the rate of rotation of the variable speed preheater is changed based directly on measurements of the temperature of the heated air stream. This differs from the preferred embodiment wherein the temperature of the cooled flue gas stream is continuously monitored. In both embodiments, the instantaneous temperature of the gas stream is compared to a set point or reference temperature representative of a desired temperature for the gas stream. In the second major embodiment of the invention, the set point is the preferred temperature of the heated air stream as it is being charged to combustion zone.

The objective of the second embodiment is to reduce fluctuations in the operation of the combustion zone by reducing or eliminating changes in the temperature of the heated air stream. These temperature changes may be caused by internal conditions, such as those previously mentioned, or external factors such as sudden climatic changes or the normal diurnal temperature change. The rate of rotation of the variable speed preheater is therefore adjusted, as much as is feasible, in a manner which transfers more or less heat to the air stream as required. That is, if the instantaneous or first temperature of the heated air stream drops below the set point temperature, the rate of rotation of the preheater is increased. The increased rate of rotation should result in more heat being transferred from the flue gas stream to the air stream.

The second major embodiment of the invention may be characterized as a process for producing steam which comprises the steps of passing an air stream through a first and a second rotating air preheaters and thereby heating the air stream to a first temperature; passing the air stream into a combustion zone wherein a carbonaceous fuel is burned, with the heat released by the combustion being used at least in part to effect the vaporization of water in a boiler, and effecting the production of a high temperature flue gas stream comprising inert gases, water vapor and sulfur oxides; passing the flue gas stream through a pollution control zone wherein sulfur oxides are removed from the flue gas stream; passing the flue gas stream through said first and second rotating air preheaters and cooling the flue gas stream to a second temperature; monitoring said first temperature of the air stream at a point located between the first and the second rotating air preheaters and the combustion zone; generating a temperature difference by comparing said first temperature of the air stream with a set point representative of the desired temperature of the air stream; and adjusting the rate of rotation of either the first or the second rotating air preheaters in a manner which decreases said temperature difference while the rate of rotation of the other rotating air preheater is maintained constant.

The rate at which it may be necessary to remove heat from the flue gas stream in order to raise the temperature of the air stream to the set point may cause excessive cooling of the flue gas stream. The flue gas stream may therefore be cooled below its acid dew point or below the preselected reference temperature obtained by adding the safety factor to the present acid dew point of the flue gas stream. It is therefore preferred that the temperature of the cooled flue gas stream is monitored as part of the second major embodiment of the invention.

When the temperature of the cooled flue gas is equal to or lower than the preselected reference temperature, the set point representative of the desired temperature of the heated air stream is lowered. This adjustment of the set point may be performed periodically. The set point may also be raised automatically by the temperature comparator and controller if the instantaneous temperature of the flue gas has remained above the preselected reference temperature for extended periods on the order of four or more hours.

The pollution control zone may comprise the equipment necessary to perform any of the several sulfur oxide removal processes which are presently available. New pollution control processes and equipment which are under development may also be employed. Preferably, the pollution control zone contains several beds of metal-containing regenerable sulfur oxide acceptors, with copper being the preferred metal. Two or more acceptor beds are used in a swing operation, with the regeneration of loaded acceptors being performed on one acceptor bed while others are used for sulfur oxide removal. Each acceptor bed is repeatedly passed through a cycle comprising an acceptance step and a regeneration step. The acceptance step proceeds under dry oxidation conditions at temperatures between about 300° C. and 500° C., preferably between 325° C. and 475° C. It is normally effected by contacting the acceptor with a flue gas stream comprising sulfur oxides and sufficient oxygen to stoichiometrically combine the sulfur oxide and a metal to form a metal sulfate.

The flow of the flue gas is diverted to another acceptor bed prior to beginning the regeneration step. Regeneration of the acceptor beds is effected in the presence of a reducing gas at a temperature approximately equal to that use during the acceptance step. Temperatures of from about 200° C. to about 500° C. may be used, but the temperature is preferably maintained between 350 ° C. and 450° C. At these temperatures and in the presence of a reducing gas, the metal sulfates on the acceptor release the bulk, of the previously accepted sulfur as sulfur dioxide thereby producing a concentrated stream of sulfur dioxide. The high concentration of sulfur dioxide in this stream facilitates further processing for the recovery of elemental sulfur which is not feasible with the relatively dilute flue gas stream.

Suitable reducing gases for use during the regeneration step include hydrogen or hydrogen/carbon monoxide mixtures and various $C_1$ to $C_3$ hydrocarbons such as methane or propane. Preferably, the reducing gas comprises a mixture of steam or another inert diluent and a hydrocarbon having three or more carbon atoms per molecule. Both the regeneration and acceptance steps may be performed near atmospheric pressure at pressures normally present in a flue gas system. The regeneration step produces elemental metal on the acceptor particles, which is oxidized at the beginning of the acceptance step. Further details on the regeneration procedure are available in U.S. Pat. No. 3,832,445 and 3,892,677.

Preferably, the acceptor beds comprise pellets or extrudates in which copper is supported on a carrier material which is resistant to high temperatures and which is not attacked by sulfur oxides and other components of the flue gas stream. Examples of materials suitable for use as these inert carriers are natural clays, bauxite, alumina, silica and silica-alumina mixtures. The acceptor should have a relatively large surface area in excess of 10 $m^2/g$. The copper content of the acceptor may be as low as 1 wt.%, but preferably is from 5 to about 15 wt.%.

It has been found that about 0.1 to 1.0 wt.% of chromium, palladium or silver promotes the acceptor's performance. It has also been found that the stability of copper-containing acceptors may be increased by the inclusion of a small quantity, that is less than 5 wt.% and preferably 0.2 to 2.0 wt.%, of barium oxide. The use of metals other than copper, such as vanadium or cesium, as the predominant metal component of the acceptor is known in the art. Further details on the manufacture of sulfur oxide acceptors may be obtained by reference to United States Pat. No. 3,770,647; 3,776,854; 3,989,798; 4,001,375 and 4,001,376.

The acceptor beds are preferably located in a parallel passage vapor-solid contactor, with the gas streams flowing parallel to the porous outer surfaces of the acceptor bed rather than through the bed. The acceptor beds may take the form of planar or cylindrical envelopes of woven wire mesh. A layer of acceptor pellets which is about 1.5 to 10 cm. thick is preferably retained between two parallel woven wire screens in each acceptor envelope. Parallel passage contactors used as acceptor beds are more fully described in United States Pat. No. 3,501,897; 3,707,831 and 3,747,308.

The pollution control zone may also contain a moving or fluidized bed of acceptor particles. Another variation is the passage of the flue gas stream through a slowly moving bed of acceptors in the cross-current mode of operation as described in U.S. Pat. No. 4,004,885. The catalytic reduction of nitrogen oxides to nitrogen may also be performed in the pollution control zone.

The particle removal zone may comprise cyclone-type particle separators and/or an electrostatic precipitator. The inventive concept is not related to the use or operation of this zone, but it has been illustrated to more fully illustrate how the subject invention relates to the total combustion facility.

I claim as my invention:

1. In a process for the operation of a fired power plant wherein:
   (a) an air stream is heated by passage through a first rotating air preheater which is rotated at a substantially constant rate;

(b) the air stream is then passed into a combustion zone wherein a carbonaceous fuel is burned;

(c) a relatively high temperature flue gas stream is removed from the combustion zone;

(d) the flue gas stream is subsequently passed through an economizer wherein it is cooled by indirect heat exchange against water which is to be charged to a boiler;

(e) sulfur oxides are removed from the flue gas stream in a pollution control zone; and, (f) the flue gas stream is then further cooled by passage through the first rotating air preheater, the improvement which comprises:

i. passing the flue gas stream and the air stream through a second rotating air preheater and effecting the cooling of the flue gas stream and the heating of the air stream, with the second rotating air preheater having a variable rate of rotation;

ii. monitoring an instantaneous temperature of the flue gas stream measured after the flue gas stream has been cooled in the first and the second rotating air preheaters;

iii. generating a temperature difference by comparing the instantaneous temperature of the flue gas stream and a preselected reference temperature; and, iv. adjusting the rate of rotation of the second rotating air preheater in a manner which decreases said temperature difference.

2. The improvement of claim 1 further characterized in that the air stream is passed first through the first rotating air preheater and then through the second rotating air preheater, and in that the flue gas stream is passed first through the second rotating air preheater and then through the first rotating air preheater.

3. In a process for generating heat by the combustion of a hydrocarbonaceous fuel wherein an air stream is heated by passage through a first and a second rotating air preheaters, the air stream is subsequently passed into a combustion zone wherein the carbonaceous fuel is burned and a flue gas stream is formed, the flue gas stream is treated for the removal of sulfur oxides by passage through a pollution control zone and is subsequently cooled to an instantaneous temperature by passage through the second and the first rotating air preheaters, the method of controlling the rate of heat exchange between the air stream and the flue gas stream within the first and the second rotating air preheaters which comprises the steps of:

(a) monitoring the instantaneous temperature of the flue gas stream at a point downstream of the first and the second rotating air preheaters, while the first rotating air preheater is being rotated at a substantially constant rate;

(b) comparing the instantaneous temperature of the flue gas stream and a first preselected reference temperature and thereby determining a temperature difference; and;

(c) adjusting the rate of rotation of the second rotating air preheater in a manner which decreases said temperature difference.

4. The control method of claim 3 further characterized in that the first preselected reference temperature is determined by a series of steps which comprises:

(i) determining the relative concentration of at least one chemical chosen from the group consisting of sulfur dioxide, sulfur trioxide, nitrogen, sulfur, water, carbon dioxide and carbon monoxide in the flue gas stream at a point downstream of the pollution control zone;

(ii) determining the present acid dew point temperature of the flue gas stream downstream of the pollution control zone based on the relative concentrations of the chemical compounds determined in step (i);

(iii) calculating a second preselected reference temperature by adding a safety factor of at least 10 centigrade degrees to the present acid dew point temperature determined in step (ii);

(iv) replacing the first preselected reference temperature with the second preselected reference temperature; and, (v) periodically repeating steps (i) to (iv).

5. A process for producing steam which comprises the steps of:

(a) passing an air stream through a first and a second rotating air preheaters and thereby heating the air stream to a first temperature;

(b) passing the air stream into a combustion zone wherein a carbonaceous fuel is burned, with the heat released by the combustion being used at least in part to effect the vaporization of water in a boiler, and effecting the production of a high temperature flue gas stream comprising inert gases, water vapor and sulfur oxides;

(c) passing the flue gas stream through a pollution control zone wherein sulfur oxides are removed from the flue gas stream;

(d) passing the flue gas stream through said first and second rotating air preheaters and cooling the flue gas stream to a second temperature;

(e) monitoring said first temperature of the air stream at a point located between the first and the second rotating air preheaters and the combustion zone;

(f) generating a temperature difference by comparing said first temperature of the air stream with a set point representative of the desired temperature of the air stream; and, (g) adjusting the rate of rotation of either the first or the second rotating air preheaters in a manner which decreases said temperature difference while the rate of rotation of the other rotating air preheater is maintained constant.

6. The process of claim 5 further characterized in that said set point representative of the desired temperature of the air stream is adjusted to a new value representative of a lower temperature when said second temperature is lower than a preselected reference temperature which is calculated by adding a safety factor of at least 10 centigrade degrees to the present acid dew point temperature of the flue gas stream based on the composition of the flue gas stream passing through said first and second rotating air preheaters.

* * * * *